(12) United States Patent
Puttagunta et al.

(10) Patent No.: US 12,430,374 B1
(45) Date of Patent: Sep. 30, 2025

(54) PLATFORM AGNOSTIC SCALABLE AND HIGH-PERFORMANCE SEMANTIC SEARCH FRAMEWORK

(71) Applicant: ServiceNow, Inc., Santa Clara, CA (US)

(72) Inventors: Sriram Puttagunta, Hyderabad (IN); Jishnu Sethumadhavan Nair, Hyderabad (IN); Bidyapati Pradhan, Hyderabad (IN); Nirali Dineshbhai Popat, Hyderabad (IN); Sravan Ramachandran, Hyderabad (IN); Vipul Mittal, Hyderabad (IN); Seganrasan Subramanian, Hyderabad (IN); Ranga Prasad Chenna, Hyderabad (IN)

(73) Assignee: ServiceNow Inc., Santa Clara, CA (US)

( * ) Notice: Subject to any disclaimer, the term of this patent is extended or adjusted under 35 U.S.C. 154(b) by 0 days.

(21) Appl. No.: 18/623,844

(22) Filed: Apr. 1, 2024

(51) Int. Cl.
*G06F 16/33* (2019.01)
*G06F 16/334* (2025.01)

(52) U.S. Cl.
CPC ................ *G06F 16/3347* (2019.01)

(58) Field of Classification Search
CPC .................................. G06F 16/3347
USPC ........................................ 707/769
See application file for complete search history.

(56) References Cited

U.S. PATENT DOCUMENTS

| | | | |
|---|---|---|---|
| 10,089,580 B2 | 10/2018 | Shan et al. | |
| 10,558,666 B2 | 2/2020 | Huddleston et al. | |
| 10,740,374 B2* | 8/2020 | Deng | G06F 16/93 |
| 12,032,915 B2* | 7/2024 | Huang | G06F 16/901 |
| 2019/0251595 A1* | 8/2019 | Ordentlich | G06N 3/044 |
| 2019/0325348 A1* | 10/2019 | Carranza | G06F 18/213 |
| 2021/0182486 A1 | 6/2021 | Yoo | |
| 2021/0374525 A1* | 12/2021 | Bremer | G06F 18/214 |
| 2022/0269706 A1 | 8/2022 | Balasubramanian et al. | |
| 2024/0127312 A1* | 4/2024 | Engel | G06Q 10/087 |
| 2024/0303262 A1* | 9/2024 | Lanka | G06F 16/3347 |
| 2024/0420011 A1* | 12/2024 | Cirulis | G06N 20/00 |

FOREIGN PATENT DOCUMENTS

| | | |
|---|---|---|
| EP | 3929767 A1 | 12/2021 |
| JP | 2022538861 A | 9/2022 |
| KR | 102345007 B1 | 12/2021 |
| WO | 2018035139 A1 | 2/2018 |
| WO | 2023153686 A1 | 8/2023 |

OTHER PUBLICATIONS

Hadi, Asaad Sabah, et al., "A Machine Learning Algorithm for Searching Vectorised RDF Data", WAINA 2013, Barcelona, Spain, Mar. 25-28, 2013, pp. 613-618.*

(Continued)

*Primary Examiner* — Robert Stevens
(74) *Attorney, Agent, or Firm* — FLETCHER YODER PC

(57) ABSTRACT

Various implementations disclosed herein include performing a semantic search for records related to an input query according to a similarity score identified using a second machine learning model of a second platform based on training artifacts generated using a first machine learning model of a first platform.

20 Claims, 7 Drawing Sheets

(56) References Cited

OTHER PUBLICATIONS

López-Cuadrado, José Luis, et al., "Automatic Learning Framework for Pharmaceutical Record Matching", IEEE Access, vol. 8, Sep. 30, 2020, pp. 171754-171770.*

Tu Zhucheng et al.; "An Exploration of Approaches to Integrating Neural Reranking Models in Multi-Stage Ranking Architecture"; arXiv.org; 236 Jul. 2017 (XP093282238) [retrieved from internet: https://arxiv.org/pdf/1707.08275] 6 pages.

International Search Report and Written Opinion for PCT Application No. PCT/US2025/020346 dated Jun. 25, 2025; 9 pgs.

\* cited by examiner

PLATFORM AGNOSTIC SCALABLE AND HIGH-PERFORMANCE SEMANTIC SEARCH FRAMEWORK

TECHNICAL FIELD

The present disclosure relates to searching for records in a database, and in particular performing semantic search in a large knowledgebase.

BACKGROUND

A semantic search is a method to search by interpreting the meaning/context of the query. When executing a semantic search, the system extracts the context of the query and returns results that are similar in content and/or context to the query. Compared to traditional keyword searching, semantic searching generally provides better results.

SUMMARY

One aspect of the disclosure includes a method for performing a semantic search. The method may include obtaining a plurality of records. The method may further include generating a set of training artifacts by, for each record of the plurality of records, vectorizing, using a first machine learning model of a first platform, the respective record into a respective artifact and adding the respective artifact to the set of training artifacts. The method may further include receiving a query at a second machine learning model of a second platform. The method may further include loading the set of training artifacts to the second machine learning model of the second platform. The method may further include vectorizing, using the second machine learning model, the query. The method may further include, for each artifact of the set of training artifacts, comparing, using the second machine learning model, the vectorized query to the respective artifact to produce a similarity score, identifying a matching artifact, wherein the matching artifact comprises the highest similarity score, and returning, in response to the query, the matching artifact.

Implementations of the disclosure may include one or more of the following features. The method may indicate that vectorizing the query includes dividing, using a sentencer, the query into a plurality of portions and vectorizing, using the second machine learning model, each portion of the plurality of portions. The method may include, for each artifact of the set of artifacts, reducing a precision format of the artifact through truncation. The method may further include for each artifact of the set of artifacts, reducing a dimensionality of the artifact. The method may additionally indicate the first machine learning model of a first platform is Python-based and the second machine learning model of a second platform is a Java-based. The method may additionally indicate that vectorizing the respective record into a respective artifact further comprises performing a term frequency-inverse document frequency (TF-IDF) algorithm on the respective record. The method may additionally indicate that vectorizing the respective record into a respective artifact further comprises performing a Google universal sentence encoder (GUSE) algorithm on the respective record.

Another aspect of the disclosure includes a system comprising one or more processors and a memory including computer-executable instructions. The one or more processors, when executing the computer-executable instructions, may cause the system to obtain a plurality of records. The one or more processors may further cause the system to generate a set of training artifacts by, for each record of the plurality of records, vectorizing, using a first machine learning model of a first platform, the respective record into a respective artifact and adding the respective artifact to the set of training artifacts. The one or more processors may further cause the system to receive a query at a second machine learning model of a second platform. The one or more processors may further cause the system to load the set of training artifacts to the second machine learning model of the second platform. The one or more processors may further cause the system to vectorize, using the second machine learning model, the query. The one or more processors may further cause the system to, for each artifact of the set of training artifacts, compare, using the second machine learning model, the vectorized query to the respective artifact to produce a similarity score, identify a matching artifact, wherein the matching artifact comprises the highest similarity score, and return, in response to the query, the matching artifact.

Implementations of the disclosure may additionally include one or more of the following features. The one or more processors may further cause the system to indicate that vectorizing the query includes dividing, using a sentencer, the query into a plurality of portions and vectorizing, using the second machine learning model, each portion of the plurality of portions. The one or more processors may further cause the system to, for each artifact of the set of artifacts, reduce a precision format of the artifact through truncation. The one or more processors may further cause the system to, for each artifact of the set of artifacts, reduce a dimensionality of the artifact. The one or more processors may further cause the system to indicate the first machine learning model of a first platform is Python-based. The one or more processors may further cause the system to indicate that vectorizing the respective record into a respective artifact further comprises performing a term frequency-inverse document frequency (TF-IDF) algorithm on the respective record. The system may be a data center and the plurality of records may be stored on a database in a server in the data center.

Another aspect of the disclosure includes a non-transitory computer-readable storage medium having stored thereon executable instructions that are executable by one or more processors of a computer system. The computer-readable storage medium may include instructions that cause the computer system to obtain a plurality of records. The computer-readable storage medium may include instructions that cause the computer system to generate a set of training artifacts by, for each record of the plurality of records, vectorizing, using a first machine learning model of a first platform, the respective record into a respective artifact and adding the respective artifact to the set of training artifacts. The computer-readable storage medium may include instructions that cause the computer system to receive a query at a second machine learning model of a second platform. The computer-readable storage medium may include instructions that cause the computer system to load the set of training artifacts to the second machine learning model of the second platform. The computer-readable storage medium may include instructions that cause the computer system to vectorize, using the second machine learning model, the query. The computer-readable storage medium may include instructions that cause the computer system to, for each artifact of the set of training artifacts, compare, using the second machine learning model, the vectorized query to the respective artifact to produce a similarity score, identify a matching artifact, wherein the matching artifact comprises the highest similarity score, and return, in response to the query, the matching artifact.

Implementations of the disclosure may additionally include one or more of the following features. The computer-readable storage medium may further include instructions that cause the computer system to indicate that vectorizing the query includes dividing, using a sentencer, the query into a plurality of portions and vectorizing, using the second machine learning model, each portion of the plurality of portions. The computer-readable storage medium may further include instructions that cause the computer system to, for each artifact of the set of artifacts, reduce a dimensionality of the artifact. The computer-readable storage medium may further include instructions that cause the computer system to indicate the second machine learning model of a second platform is Java-based. The computer-readable storage medium may further include instructions that cause the computer system to indicate that vectorizing the respective record into a respective artifact further comprises performing a GUSE algorithm on the respective record. The computer-readable storage medium may further include instructions that cause the computer system to identify additional matching artifacts, wherein the additional matching artifacts comprise second highest similarity scores and return, in response to the query, the additional matching artifacts.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Various embodiments in accordance with the present disclosure will be described with reference to the drawings, in which.

DETAILED DESCRIPTION

Figure 1:
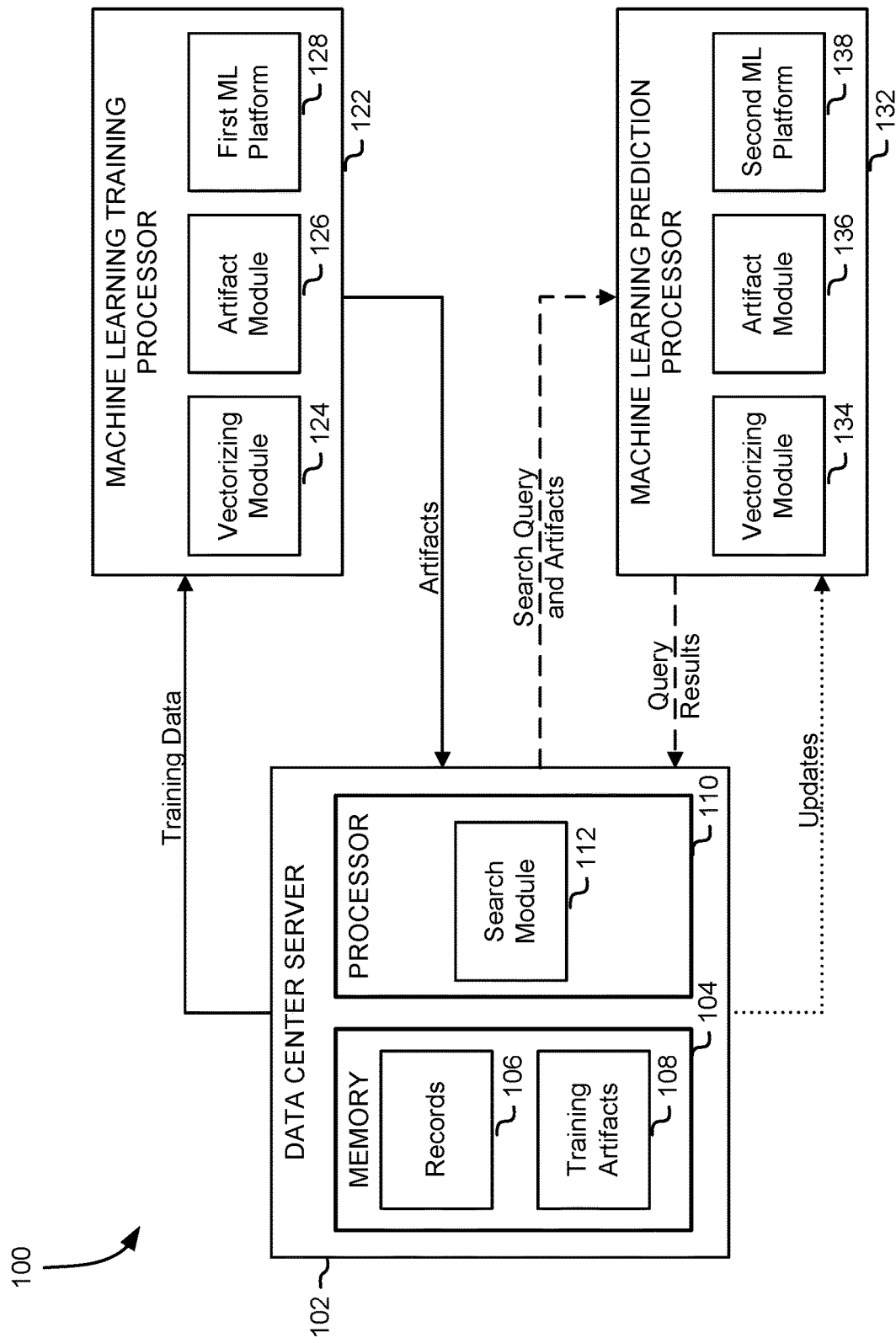
FIG. 1 illustrates a semantic search system, according to at least one embodiment.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

Machine learning (ML) models are used to perform semantic searching to identify records in a database that are similar in content to one another. However, these models may have limited ML usability due to implementation of training and inferencing using only one platform (e.g., Java.) For example, a Java platform may work well for performing the semantic search (inferencing), but may not work well as a platform for fast and accurate training of the model. In those cases, it would be desirable train the model on a first platform (that performs better at training) and implement the trained model on a second platform (that performs better at inferencing).

Various implementations disclosed herein include performing a semantic search for records related to an input query according to a similarity score identified using a second machine learning model of a second platform based on training artifacts generated using a first machine learning model of a first platform.

To that end, in some implementations, a knowledgebase instance is input to a ML model implemented using a first platform (e.g., Python) for training. In particular, the first ML model converts a plurality of documents from a knowledge base into a set of artifacts by vectorizing each of the documents. Here, the artifacts represent a semantic intent of the respective document. The artifacts are returned to a second ML model implemented using a second platform (e.g., Java). In one embodiment, the first ML model and the second ML model are the same ML model, implemented for and accessed by different platforms. In another embodiment, the first ML model and the second ML model are different ML models implemented on different platforms.

In some implementations, when a user initiates a search request, the second ML model converts the request to a vector and compares the input request vector to each of the artifacts in the set of training artifacts (also referred to herein as "vector artifacts"). If the request artifact matches a training artifact (e.g., has a high similarity score), then the two artifacts are considered to have high semantic similarity. The second ML model may then return the documents which have the highest semantic similarity to the user as a response to the query.

By implementing the systems and methods disclosed herein, training and inferencing systems can be separately established (also referred to as "platform agnostic"), such that the better implementation for each can be used without affecting the other systems. Furthermore, by implementing the systems and methods disclosed herein, an amount of time needed to train a machine learning system can be reduced by 68%. Additionally, by implementing the systems and methods disclosed herein, the amount of time required to identify a similarity between an input query and a record in a database during inferencing can be reduced by over 50% and the quality (relevancy) of the results relative to a semantic search query increases by over 15%.

FIG. 1 illustrates a semantic search system 100, according to at least one embodiment. In at least one embodiment, system 100 comprises one or more data center servers 102, one or more machine learning (ML) training processors 122, and one or more machine learning (ML) prediction processors 132. Data center server 102 may further comprise a memory 104 and a processor 110. ML training processor 122 may further comprise a vectorizing module 124, an artifact module 126, and a first machine learning platform 128. ML prediction processor 132 may further comprise a vectorizing module 134, an artifact module 136, and a second machine learning platform 138. In at least one embodiment, first ML platform 128 and second ML platform 138 are different platforms (e.g., Python and Java). In at least one embodiment, ML training processor 122 and/or ML prediction processor 132 are remotely located from data center server 102 (e.g., in another system or within another server of a data center) and communicates with processor 110 and memory 104 over a network. In at least one embodiment, ML training processor 122 and/or ML prediction processor 132 are circuitry within data center server 102.

In at least one embodiment, system 100 performs a semantic search process comprising: obtaining a plurality of records; generating a set of training artifacts by, for each record of the plurality of records, vectorizing, using a first machine learning model of a first platform, the respective record into a respective artifact; and adding the respective artifact to the set of training artifacts; receiving a query at a second machine learning model of a second platform; loading the set of training artifacts to the second machine learning model of the second platform; vectorizing, using the second machine learning model, the query; and for each artifact of the set of training artifacts, comparing, using the second machine learning model, the vectorized query to the respective artifact to produce a similarity score; identifying a matching artifact, wherein the matching artifact comprises the highest similarity score; and returning, in response to the query, the matching artifact.

In at least one embodiment, system 100 receives and stores various database records 106 in memory 104 of data center server 102. Database records 106 may, for example, comprise text records (e.g., knowledgebase articles, company information, customer information, etc.) and/or any other type of data record. In at least one embodiment, database records 106 stored in memory 104 are all of a same data type (e.g., containing only text records). Memory 104 of data center server 102 may further include training artifacts 108. In at least one embodiment, training artifacts are vector representations corresponding to each of records 106 stored in memory 104. These vector representations may be vectors that have been compressed and reduced in dimension, which reduces the amount of memory required for storage in memory 104.

In at least one embodiment, data center server 102 includes a processor 110 with search module 112. In at least one embodiment, processor 110 comprises a processing unit, such as a graphics processing unit (GPU), general-purpose GPU (GPGPU), parallel processing unit (PPU), central processing unit (CPU)), a data processing unit (DPU), a part of a system on chip (SoC), or combination thereof. In at least one embodiment, processor 110 receives an input query from a user and uses search module 112 to initiate a semantic search based on the input query.

In at least one embodiment, the training artifacts 108 used with processor 110 and search module 112 are trained and generated using ML training processor 122. In at least one embodiment, ML training processor 122 comprises a processing unit, such as a graphics processing unit (GPU), general-purpose GPU (GPGPU), parallel processing unit (PPU), central processing unit (CPU)), a data processing unit (DPU), a part of a system on chip (SoC), or combination thereof.

In at least one embodiment, a training process (indicated by solid arrows in FIG. 1) is performed between data center server 102 and ML training processor 122. At first training, training data may be transferred from processor 110 of data center server 102 to ML training processor 122. In at least one embodiment, this training data includes part or all of records 106. In at least one embodiment, ML training processor 122 receives records 106 at first ML platform 128.

In at least one embodiment, first ML platform 128 is a Python-based platform (e.g., Nagini). ML training processor 122 may convert each training record of the training data to a vector artifact using vectorizing module 124. ML training processor 122 may use vectorizing module 124 to convert text records to vectors using a term frequency-inverse document frequency (TF-IDF) algorithm or a Google universal sentence encoder (GUSE) algorithm. In at least one embodiment, a TF-IDF algorithm may be a native implementation of the algorithm requiring no standard libraries, which increases the speed of its user. In at least one embodiment, ML training processor 122 may further use vectorizing module 124 to use a sentencer model (e.g., a Spacy multilingual sentencer model), which divides large input text into smaller portions.

In an embodiment, vectorizing module 124 uses the sentencer model to intelligently divide large text into portions, such that sentences belonging to the same paragraph are kept together and context for each portion is maintained, and processing each portion of the large text. Further description of a sentencer process is described with reference to FIG. 6B.

In at least one embodiment, ML training processor 122 uses first ML platform 128 with artifact module 126 to generate training artifacts from data that has been vectorized from vectorizing module 124. For example, artifact module 126 may perform data compression on a vector received from vectorizing module 124 to generate a training artifact. Artifact module 126 may perform data compression by reducing a dimension or a precision of an input vector. In at least one embodiment, artifact module 126 performs data compression depending on the type of algorithm used to generate a vector. For example, artifact module 126 may reduce an input vector generated using GUSE from float32 to float6 format (e.g., a float value with six decimal places), which reduces a number of vector dimensions from 512 to 150.

In at least one embodiment, after all records 106 of the training data has been processed into training artifacts, ML training processor 130 transmits and stores the artifacts in memory 104 as training artifacts 108.

In at least one embodiment, performing some or all of the processes of system 100 as described with respect to training may reduce the amount of time necessary to generate artifacts and train a machine learning system by over 68%.

In at least one embodiment, a prediction/inference process (indicated by dashed arrows in FIG. 1) is performed between data center server 102 and ML prediction processor 132. During inferencing, processor 110 receives an input search query from a user at search module 112. Search module 112 may then transmit the input search query and the stored training artifacts 108 to ML prediction processor 132.

In at least one embodiment, ML prediction processor 132 receives the input search query and training artifacts 108 at second ML platform 138. In at least one embodiment, second ML platform 138 is a Java-based platform. ML prediction processor 132 may convert the input search query to a vector artifact using vectorizing module 134. ML prediction processor 132 may use vectorizing module 134 to convert the input query to vectors using a term frequency-inverse document frequency (TF-IDF) algorithm or a Google universal sentence encoder (GUSE) algorithm. In at least one embodiment, a TF-IDF algorithm may be a native implementation of the algorithm requiring no standard libraries, which increases the speed of its user. ML prediction processor 132 may further use vectorizing module 134 to user a sentencer model, which divided large input text of the input query in the same manner as previously described with respect to the ML training processor 122.

In at least one embodiment, ML prediction processor 132 uses second ML platform 138 with artifact module 136 to generate a vector artifacts of the input query from data received from vectorizing module 134. For example, artifact module 136 may perform data compression on a vector received from vectorizing module 134 to generate the vector artifact. Artifact module 136 may perform data compression by reducing a dimension or a precision of an input vector. In at least one embodiment, artifact module 136 performs data compression depending on the type of algorithm used to generate a vector. For example, artifact module 136 may reduce dimensions of an input vector generated using GUSE from 512 to 150 and further compress the value from float32 to float6 format.

In at least one embodiment, ML prediction processor 132 uses second ML platform 138 with artifact module 136 to compare the vector artifact generated from the input search query with training artifacts 108 received from memory 104. In at least one embodiment, an average of the vector artifact and a training artifact generates a similarity score, where high similarity scores identify whether the input search query has similar content or contexts to a given record stored in memory 104. After records having high similarity scores have been identified, ML prediction processor 132 may return output query results to search module 112, which outputs the results to a user.

In at least one embodiment, performing some or all of the processes of system 100 as described with respect to prediction/inference may reduce the amount of time necessary to perform a semantic search by over 50% because the prediction time requires to identify a similar or relevant result is reduced. Furthermore, performing some or all of the processes of system 100 as described with respect to prediction/inference may increase the quality of resulting records returned in response to a query by 15% due to better semantic matching of large texts.

In at least one embodiment, an artifact update process (indicated by dotted arrow in FIG. 1) is performed between data center server 102, ML training processor 122, and ML prediction processor 132. During updating, processor 110 receives a newly stored input record from records 106. Processor 110 may then transmit the new input record to ML training processor 122 to generate a new training artifact corresponding to the new record using the same training process as previously described and adds the new training artifact to training artifacts 108. Then, the updated artifact may be transmitted ML prediction processor 132 for use in comparison with any new queries using the same inference process as previously described.

In an embodiment, some or all of the processes of system 100 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process of system 100 may be performed by any suitable system, such as the computing device 700 of FIG. 7.

Figure 2:
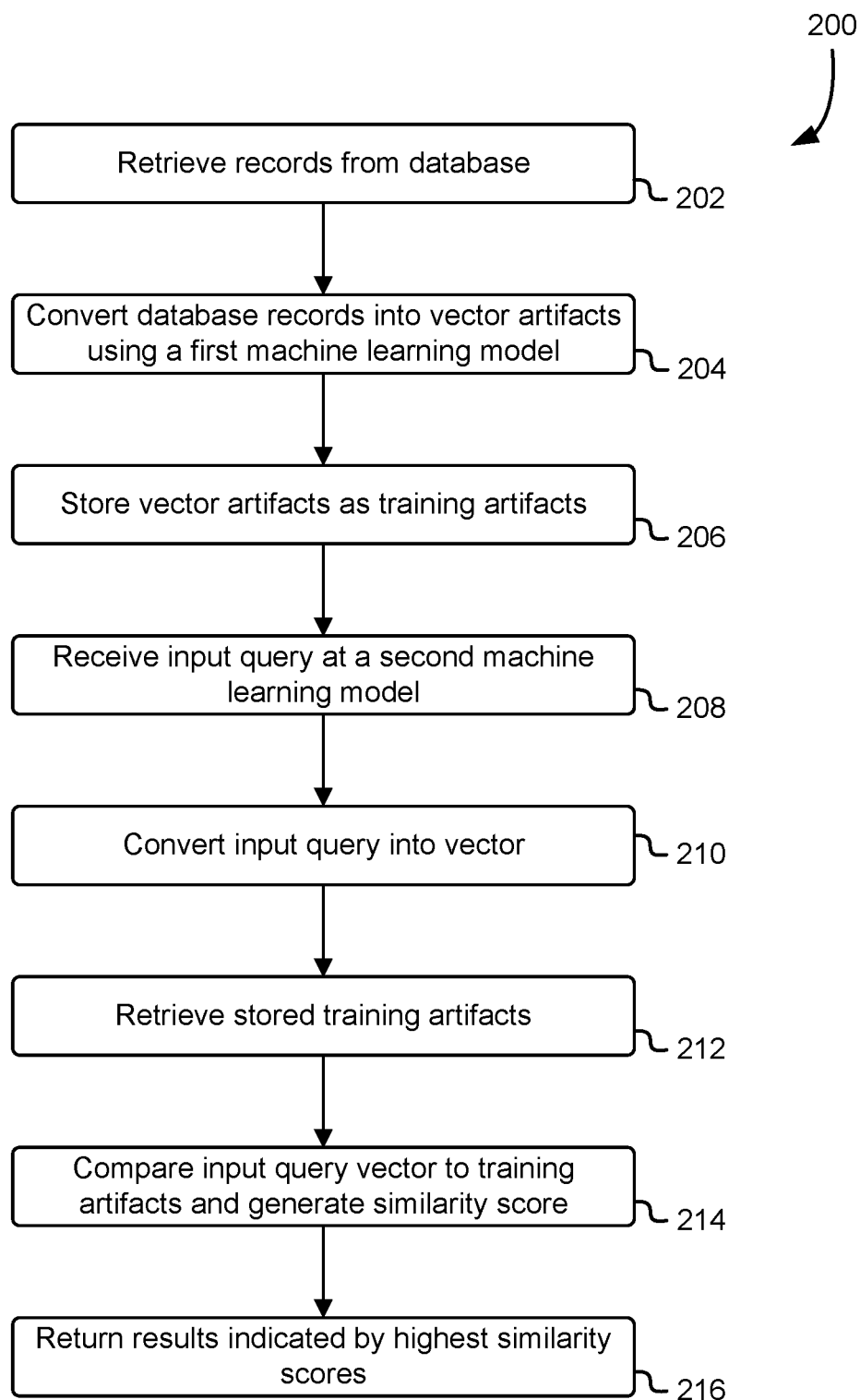
FIG. 2 illustrates a semantic search process, according to at least one embodiment.

FIG. 2 illustrates a semantic search process 200, according to at least one embodiment. In at least one embodiment, process 200 can be performed by the system in FIG. 1 (e.g., semantic search system 100) to perform a semantic search and identify related records in response to a query.

In at least one embodiment, at step 202, a processor (e.g., processors 110, 122, or 132) retrieves records from a database (e.g., records 106) for training. These records may be used for training a machine learning model (e.g., first ML platform 128) using a training processor (e.g., ML training processor 122 of FIG. 1). In at least one embodiment, these records include a large number of large text records (e.g., text having many words or paragraphs.) The training processor may then further divide the text records into smaller portions using a sentencer model in a same manner as previously described. Further description of a sentencer process is described with reference to FIG. 6B.

In at least one embodiment, at step 204, a processor converts the database records retrieved at step 202 into vector artifacts using a first machine learning model designated for training. For example, ML training processor 122 generates a vector artifact representing of each of the database records using a TF-IDF or GUSE algorithm using a Python-based (e.g., Nagini) ML platform. In at least one embodiment, by using a separate platform for training than for inferencing, ML model training can be improved by using a platform better suited for training, which can increase accuracy of the trained ML model and can reduce the training time by over 60%.

In at least one embodiment, a processor may additionally data compress vector artifacts generated at step 204. For example, a vector artifact generated using a GUSE algorithm may be reduced in dimension size or a vector artifact generated using either algorithm may be compressed by reducing a float32 value to a float6 value through truncation or rounding to the sixth decimal place. In at least one embodiment, by compressing the vector data in this manner, an ML model storage size can be reduced by approximately 50%. Further description of the data compression process is described with reference to FIG. 6C.

In at least one embodiment, at step 206, a processor stores vector artifacts or compressed vector artifacts generated at step 204 in memory as training artifacts (e.g., training artifacts 108 in memory 104).

In at least one embodiment, at step 208, a processor receives an input query to perform a semantic search through inferencing. In at least one embodiment, an inferencing processor (e.g., ML prediction processor 132) receives this input query in addition to training artifacts stored in memory (e.g., training artifacts 108 in memory 104) at step 206. The inferencing processor may, for example, use a second machine learning model using a second platform (e.g., Java) that is different from the machine learning model or platform used to generate the training artifacts at step 204. In at least one embodiment, the first machine learning model and the second machine learning model are the same machine learning model, where the machine learning model is accessible through each of the different platforms using a compatible and interoperable framework (e.g., ONNX). In another embodiment, the first ML model and the second ML model are different ML models implemented on different platforms, connected for use through a plugin, library, or a custom implementation. In at least one embodiment, by using a separate platform for inferencing than for training, ML model predictions and the semantic search process can be improved by using a platform better suited for inferencing, which can increase accuracy of inferencing and can reduce the prediction time by over 50%.

In at least one embodiment, at step 210, a processor converts the input query received at step 208 into a vector artifact. This vector artifact may be generated in a same manner as the training artifacts at step 204 based on the input query. For example, the input query may be converted to a vector artifact using vectorizing module 134 of ML prediction processor 132 using a TF-IDF algorithm or a GUSE algorithm. In at least one embodiment, a processor may additionally data compress the vector artifact corresponding to the input query. For example, a vector artifact generated using a GUSE algorithm may be reduced in dimension size or a vector artifact generated using either algorithm may be compressed by reducing a float32 value to a float6 value through truncation or rounding to the sixth decimal place. Further description of the data compression process is described with reference to FIG. 6C.

In at least one embodiment, at step 212, a processor retrieves the stored training artifacts transferred from memory 104. In at least one embodiment, at step 214, a processor then compares the vector artifact corresponding to the input query vector with the training artifacts and generates a similarity score. Further description of the scoring process is described with reference to FIG. 6A.

In at least one embodiment, at step 216, a processor then returns the records to the user according to the matching artifacts (e.g., highest similarity scores). For example, a top number of results may be transmitted to the user in descending order of similarity scores. In at least one embodiment, by identifying the similarity scores and returning results based on the similarity scores as described herein, the quality of results generated by the ML model can increase by over 15% indicating that the returned results are more accurate responses to the input query.

In an embodiment, some or all of process 200 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 200 may be performed by any suitable system, such as the computing device 700 of FIG. 7.

Figure 3:
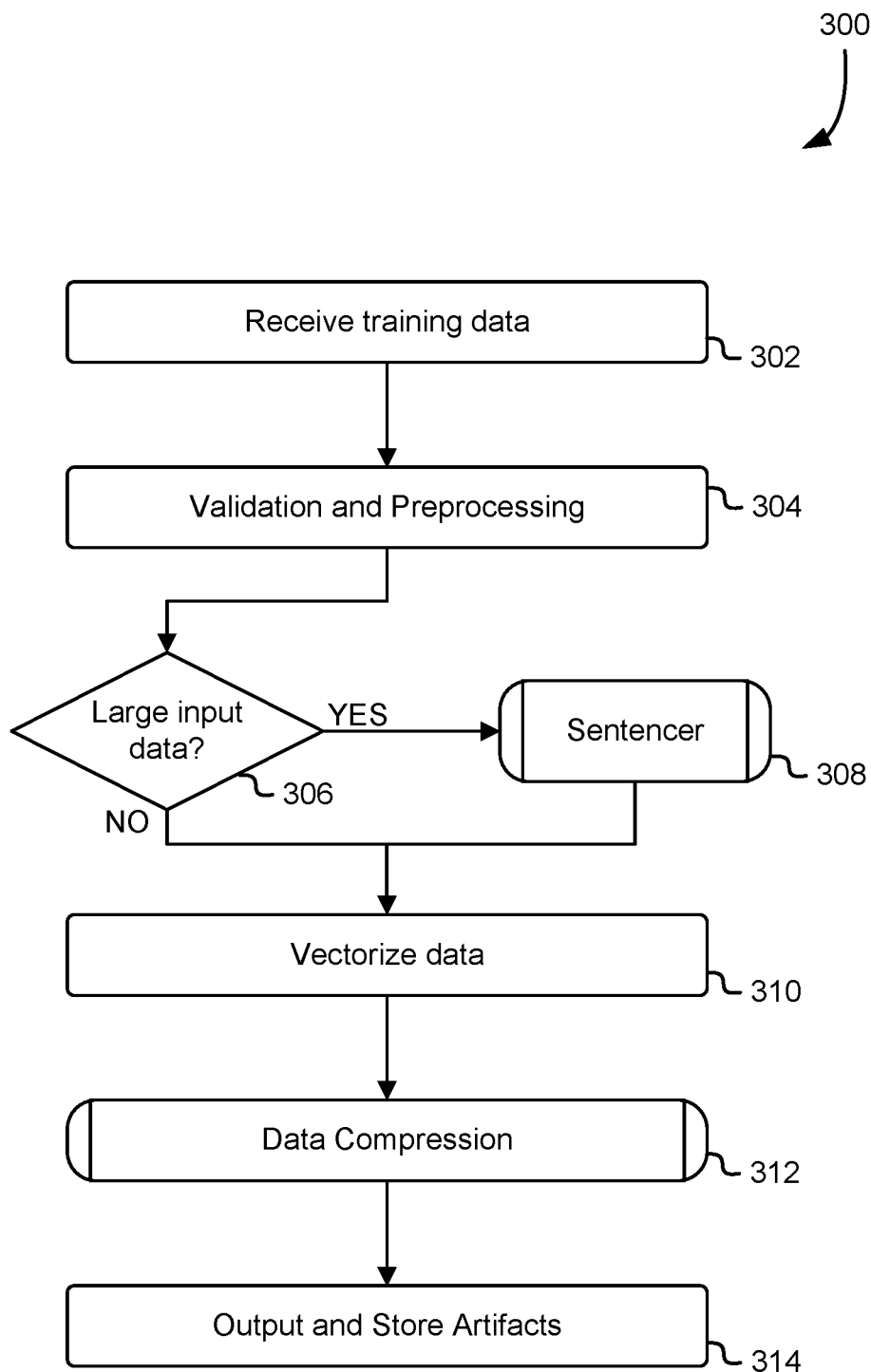
FIG. 3 illustrates a training process for training a machine learning system using a first platform, according to at least one embodiment.

FIG. 3 illustrates a training process 300 for training a machine learning system using a first platform, according to at least one embodiment. In at least one embodiment, process 300 can be performed by the system in FIG. 1 (e.g., semantic search system 100) to train a machine learning model to perform a semantic search and retrieve results from a database as a response.

In at least one embodiment, a processor (e.g., processors 110, 122, or 132) performs training process 300 to train an ML model using a first ML platform. For example, ML training processor 122 uses a Python-based machine learning platform to train a ML model, which may be different than a ML platform used for inferencing. In at least one embodiment, by using a separate platform for training than for inferencing, ML model training can be improved by using a platform better suited for training, which can increase accuracy of the trained ML model and can reduce the training time by over 60%.

In at least one embodiment, at step 302, a processor receives training data to be used to ML model training. For example, a ML training processor 122 receives database records 106 (e.g., text records from a knowledgebase) stored in memory 104 of a data center server 102 as training data to train a ML model using the first ML platform 128.

In at least one embodiment, at step 304, a processor performs validation and preprocessing on the training data received at step 302. This validation and preprocessing may include checking for data errors and preparing the data to be input to other modules for additional processing.

In at least one embodiment, at step 306, a processor determines if the training data received at step 302 include records having large text inputs (e.g., having many sentences or paragraphs.) If the training data does not include large text inputs (NO at step 306), then the training data is not processed by a sentencer model and proceeds to step 310. Otherwise, if the training data does include large text inputs (YES at step 306), then the training data is processed through a sentencer model at step 308.

In at least one embodiment, at step 308, a processor uses a sentencer model (e.g., a Spacy multilingual sentencer model) to divide large input text into smaller portions (e.g., using vectorizing module 124). For example, the sentencer model may intelligently divide large text into portions such that sentences belonging to the same paragraph are kept together, which enables better contextual understanding for a given text. Further description of the sentencer process is described with reference to FIG. 6B.

In at least one embodiment, at step 310, a processor vectorizes the data received from either step 306 or 308, as applicable (e.g., using vectorizing module 124). In at least one embodiment, if the data is received from step 306, then the data record may be directly converted to a training artifact using a TF-IDF or GUSE algorithm using a Python-based (e.g., Nagini) ML platform. In another embodiment, if the data is received from step 308, then the portions of the data divided through the sentencer model may each be converted to a vectors using a TF-IDF or GUSE algorithm using a Python-based (e.g., Nagini) ML platform. The vectors of the individual portions may then be combined (e.g., through averaging or other known techniques) to generate a training artifact for the corresponding record. In at least one embodiment, by generating training artifacts in the manner described herein, the content or context of the record may be more accurately identified, which enables more accurate identification of similarity at inferencing.

In at least one embodiment, at step 312, a processor performs data compression on the training artifacts (e.g., using artifact module 126). For example, a training artifact generated using a GUSE algorithm at step 310 may be reduced in dimension size or a training artifact generated using either algorithm may be compressed by reducing a float32 value to a float6 value through truncation or rounding to the sixth decimal place. In at least one embodiment, by compressing the vector data in this manner, an ML model storage size can be reduced by approximately 50%. Further description of the data compression process is described with reference to FIG. 6C.

In at least one embodiment, at step 314, training artifacts generated from step 310 (and step 312 if those training artifacts were data compressed) are output to a system (e.g., data center server 102) for storage in memory (e.g., training artifacts 108 in memory 104).

In at least one embodiment, performing some or all of the process 300 enables an improvement in may reduce the amount of time necessary to generate artifacts and train a machine learning system by over 68%.

In an embodiment, some or all of process 300 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as the computing device 700 of FIG. 7.

Figure 4:
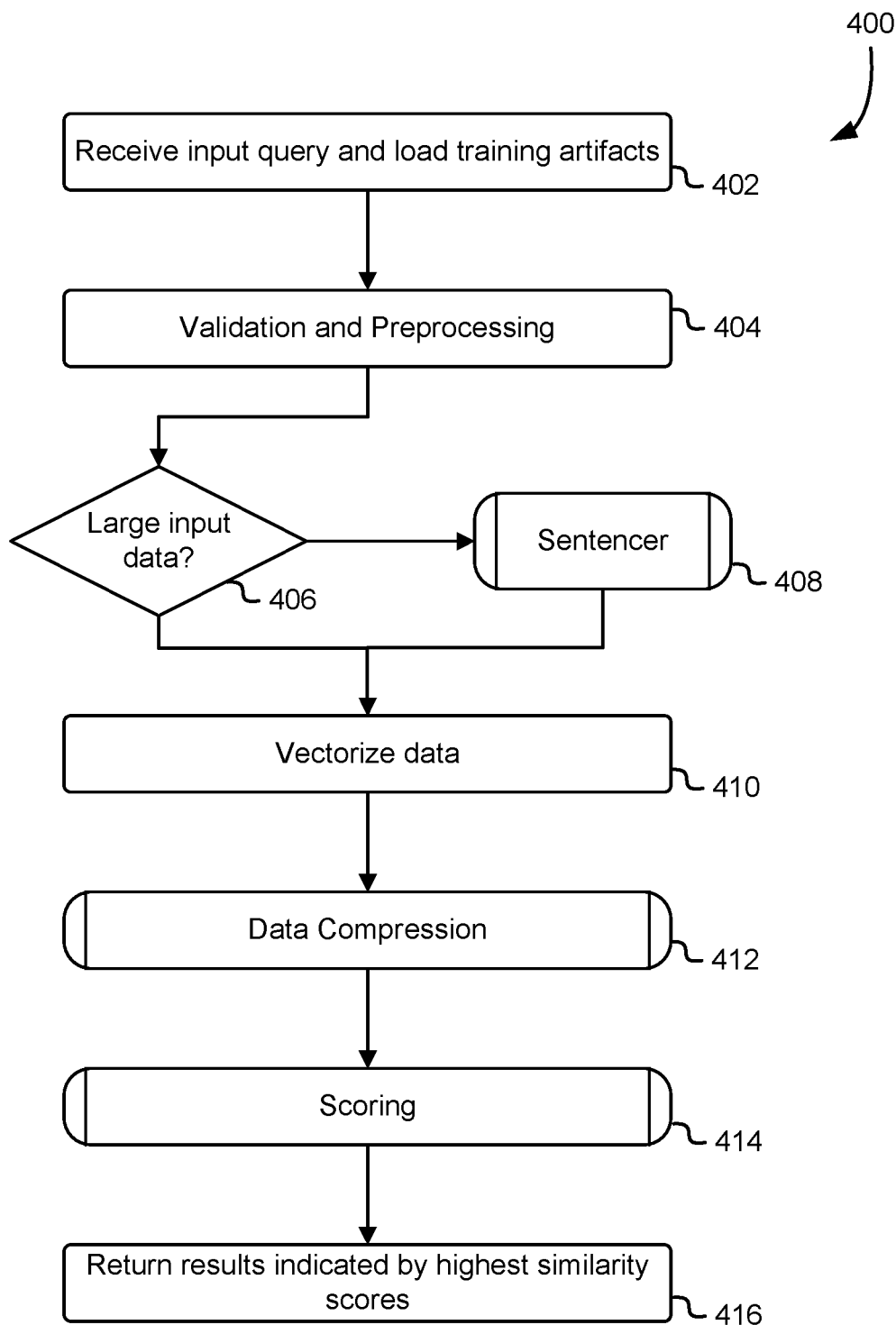
FIG. 4 illustrates an inferencing process using a machine learning system using a second platform, according to at least one embodiment.

FIG. 4 illustrates an inferencing process 400 using a machine learning system using a second platform, according to at least one embodiment. In at least one embodiment, a system such as the system described in FIG. 1 (e.g., semantic search system 100 of FIG. 1) performs process 400 to perform a semantic search and retrieve results from a database as a response.

In at least one embodiment, a processor (e.g., processors 110, 122, or 132) performs inference process 400 to perform semantic searching using an ML model of a second ML platform. For example, ML prediction processor 132 uses a Java-based machine learning platform to perform a semantic search, which may be different than a ML platform used for training. In at least one embodiment, by using a separate platform for inferencing than for training, ML model predictions and the semantic search process can be improved by using a platform better suited for inferencing, which can increase accuracy of inferencing and can reduce the prediction time by over 50%.

In at least one embodiment, at step 402, a processor (e.g., ML prediction processor 132) receives an input query (e.g., from search module 112) to perform a semantic search through inferencing along with training artifacts stored in memory (e.g., training artifacts 108 in memory 104). The processor may, for example, use a second machine learning model of a second machine learning platform (e.g., Java) that is different from the machine learning platform used to generate the stored training artifacts. In at least one embodiment, the training artifacts generated using the first machine learning model is usable by the second machine learning model directly or through use of a simple plugin or library. In at least one embodiment, the first machine learning model and the second machine learning model are the same machine learning model, where the machine learning model is accessible through each of the different platforms using a compatible and interoperable framework (e.g., ONNX). In another embodiment, the first ML model and the second ML model are different ML models implemented on different platforms, connected for use through a plugin, library, or a custom implementation.

In at least one embodiment, at step 404, a processor performs validation and preprocessing on the input query and training artifact data received at step 402. This validation and preprocessing may include checking for data errors and preparing the data to be input to other modules for additional processing.

In at least one embodiment, at step 406, a processor determines if the input data received at step 402 comprises a large text input (e.g., having many sentences or paragraphs.) If the input data does not include large text inputs (NO at step 406), then the input query is not processed by a sentencer model and proceeds to step 410. Otherwise, if the input data does include large text inputs (YES at step 406), then the input data is processed through a sentencer model at step 408.

In at least one embodiment, at step 408, a processor may optionally use a sentencer model (e.g., a Spacy multilingual sentencer model) to divide large input text into smaller portions (e.g., using vectorizing module 134). For example, the sentencer model may intelligently divide large text into portions such that sentences belonging to the same paragraph are kept together, which enables better contextual understanding for a given text. Further description of the sentencer process is described with reference to FIG. 6B.

In at least one embodiment, at step 410, a processor vectorizes the data received from either step 406 or 408, as applicable (e.g., using vectorizing module 134). In at least one embodiment, if the data is received from step 406, then the data record may be directly converted to a training artifact using a TF-IDF or GUSE algorithm using a Java-based ML platform. In another embodiment, if the data is received from step 408, then the portions of the data divided through the sentencer model may each be converted to a vectors using a TF-IDF or GUSE algorithm using a Java-based ML platform. The vectors of the individual portions may then be combined (e.g., through averaging or other known techniques) to generate a vector artifact for the input query. In at least one embodiment, by generating vector artifacts in the manner described herein, the content or context of the input query may be more accurately identified, which enables more accurate similarity analysis compared to training artifacts.

In at least one embodiment, at step 412, a processor performs data compression on the vector artifact (e.g., using artifact module 136). For example, a vector artifact generated using a GUSE algorithm at step 410 may be reduced in dimension size or a vector artifact generated using either algorithm may be compressed by reducing a float32 value to a float6 value through truncation or rounding to the sixth decimal place. Further description of the data compression process is described with reference to FIG. 6C.

In at least one embodiment, at step 414, a processor compares the vector artifact corresponding to the input query from step 412 with the training artifacts loaded at step 402 and generates a similarity score. For example, ML prediction processor 132 compares vectors of similar data types and computes an average value to generate a similarity score. Further description of the scoring process is described with reference to FIG. 6A.

In at least one embodiment, at step 416, a processor then returns the records to the user according to the matching artifacts (e.g., highest similarity scores). For example, a top number of results may be transmitted to the user in descending order of similarity scores. In at least one embodiment, by identifying the similarity scores and returning results based on the similarity scores as described herein, the quality of results generated by the ML model can increase by over 15% indicating that the returned results are more accurate responses to the input query.

In an embodiment, some or all of process 400 (or any other processes described such as process 200 of FIG. 2, process 300 of FIG. 3, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing device 700 of FIG. 7.

Figure 5:
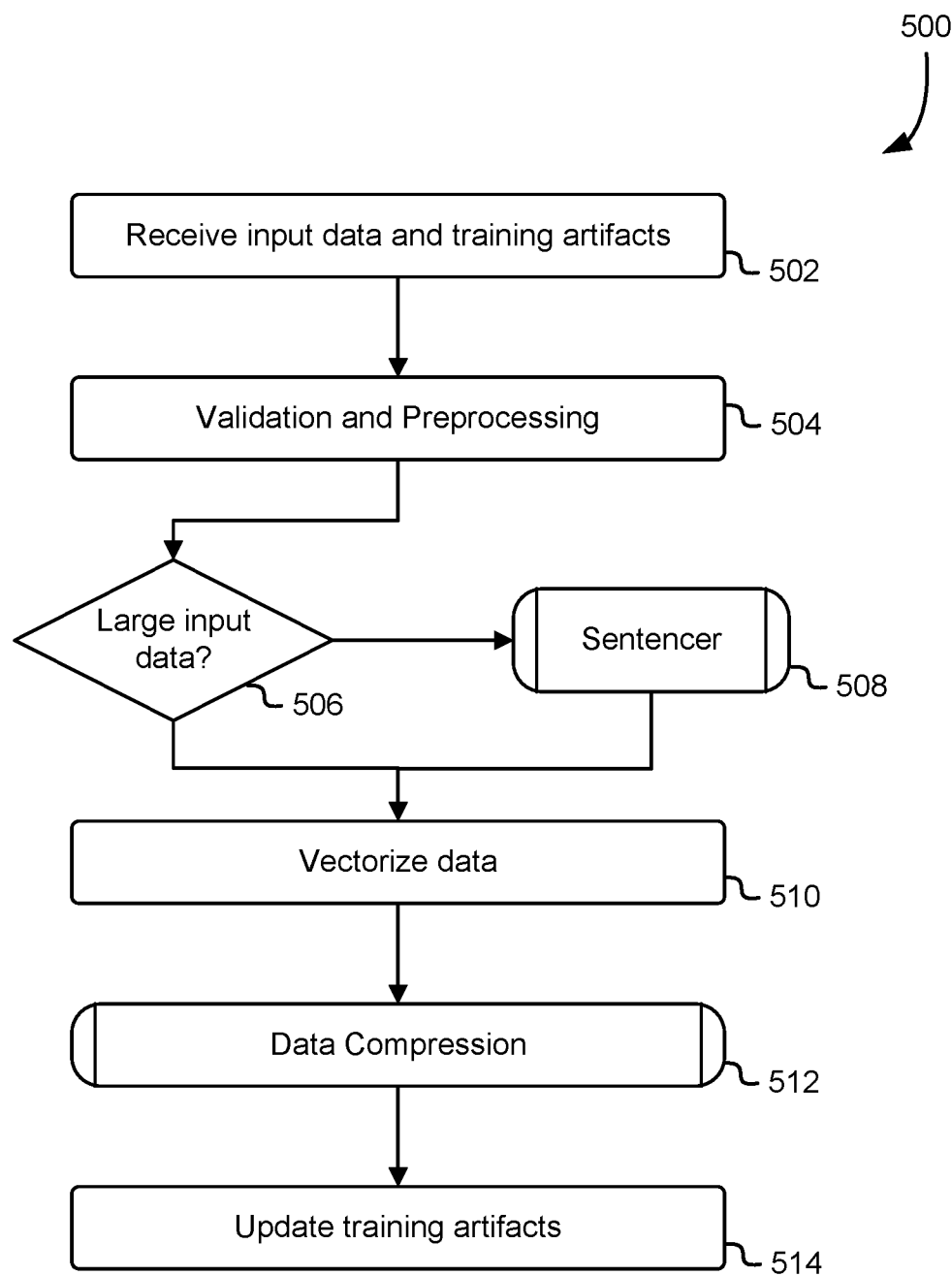
FIG. 5 illustrates an updating process using a machine learning system, according to at least one embodiment.

FIG. 5 illustrates an updating process 500 using a machine learning system, according to at least one embodiment. In at least one embodiment, process 500 can be performed by the system in FIG. 1 (e.g., semantic search system 100) to update artifacts used by a machine learning model to perform a semantic search and retrieve results from a database as a response.

In at least one embodiment, a processor (e.g., processors 110, 122, or 132) performs updating process 500 to update artifacts used by an ML model of a second ML platform. In at least one embodiment, ML predicting processor 132 uses a Java-based machine learning platform to generate updated artifacts. In another embodiment, ML training processor 122 uses a Python-based machine learning platform to generate updated artifacts.

In at least one embodiment, at step 502, a processor receives a new or updated record data from a database to be converted to an additional training artifact along with the existing training artifacts. For example, a processor receives a new database record from records 106 and the existing training artifacts 108 stored in memory 104 of a data center server 102 as additional training data and the training artifacts.

In at least one embodiment, at step 504, a processor performs validation and preprocessing on the training data received at step 502. This validation and preprocessing may include checking for data errors and preparing the data to be input to other modules for additional processing.

In at least one embodiment, at step 506, a processor determines if the update data received at step 502 include records having large text inputs (e.g., having many sentences or paragraphs.) If the training data does not include large text inputs (NO at step 506), then the update data is not processed by a sentencer model and proceeds to step 510. Otherwise, if the update data does include large text inputs (YES at step 506), then the update data is processed through a sentencer model at step 508.

In at least one embodiment, at step 508, a processor uses a sentencer model (e.g., a Spacy multilingual sentencer model) to divide large input text into smaller portions. For example, the sentencer model may intelligently divide large text into portions such that sentences belonging to the same paragraph are kept together, which enables better contextual understanding for a given text. Further description of the sentencer process is described with reference to FIG. 6B.

In at least one embodiment, at step 510, a processor vectorizes the update data received from either step 506 or 508, as applicable. In at least one embodiment, if the data is received from step 506, then the update data may be directly converted to a training artifact using a TF-IDF or GUSE algorithm. In another embodiment, if the data is received from step 508, then the portions of the update data divided through the sentencer model may each be converted to a vectors using a TF-IDF or GUSE algorithm. The vectors of the individual portions may then be combined (e.g., through averaging or other known techniques) to generate a training artifact for the corresponding update data. In at least one embodiment, by generating training artifacts in the manner described herein, the content or context of the record may be more accurately identified, which enables more accurate identification of similarity at inferencing.

In at least one embodiment, at step 512, a processor performs data compression on the updated training artifacts. For example, a training artifact generated using a GUSE algorithm at step 510 may be reduced in dimension size or a training artifact generated using either algorithm may be compressed by reducing a float32 value to a float6 value through truncation or rounding to the sixth decimal place. In at least one embodiment, by compressing the vector data in this manner, an ML model storage size can be reduced by approximately 50%. Further description of the data compression process is described with reference to FIG. 6C.

In at least one embodiment, at step 514, updated training artifacts generated from step 510 (and step 512 if those training artifacts were data compressed) are output to a system (e.g., data center server 102) for storage in memory (e.g., training artifacts 108 in memory 104).

In an embodiment, some or all of process 500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing device 700 of FIG. 7.

Figure 6C:
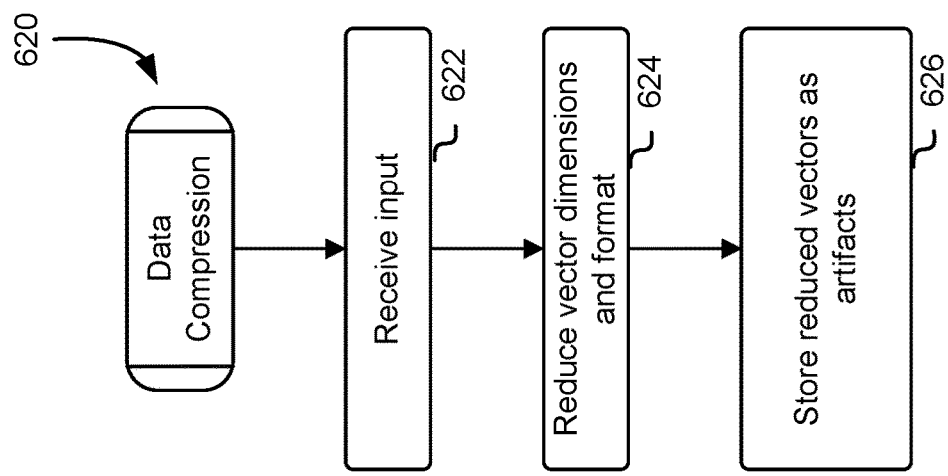
FIGS. 6A-6C illustrate shared processes used by a machine learning system during training, inferencing, and updating.
Figure 6B:
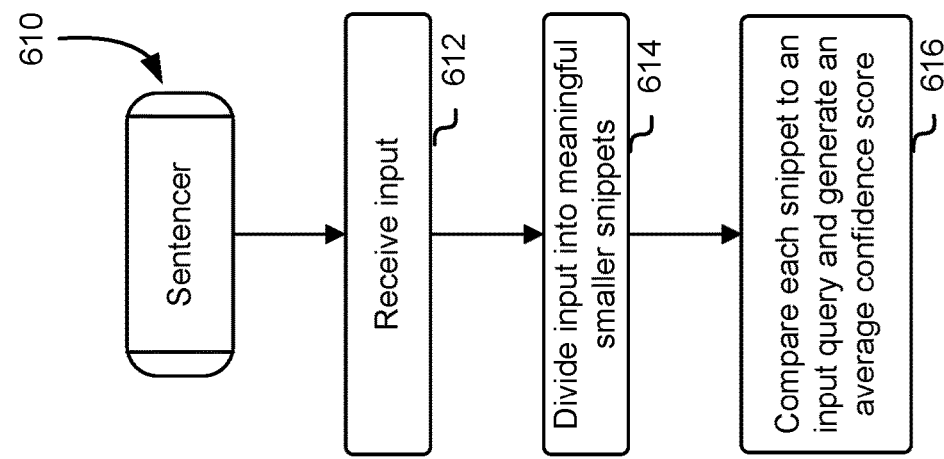
Figure 6A:
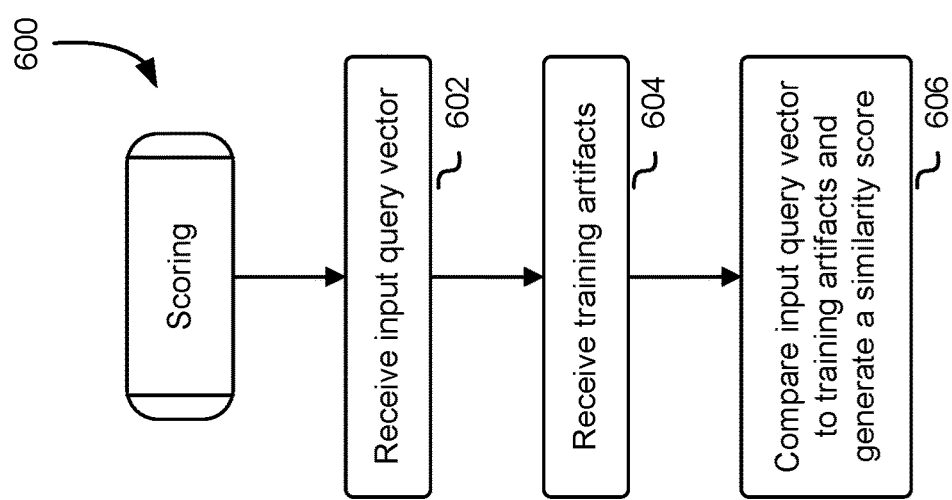

FIGS. 6A-6C illustrate shared processes used by a machine learning system, according to at least one embodiment. In at least one embodiment, processes 600, 610, and 620 can be performed by the processors (e.g., processors 110, 122, 132) of the system in FIG. 1 (e.g., semantic search system 100) in training, inferencing, and updating a machine learning model to perform a semantic search and retrieve results from a database as a response.

FIG. 6A illustrates a scoring process 600 used by a machine learning system, according to at least one embodiment. In at least one embodiment, scoring process 600 is assigns a score to each record during training, which indicates how similar it is to the other records. The scoring may be done by calculating the vector similarity by comparing the vectors of similar data types and computing the average value, improving the quality of the results achieved during inferencing by approximately 15%.

In at least one embodiment, at step 602, a processor (e.g., ML predicting processor 132) receives an input query vector (e.g., from step 410 in FIG. 4 or step 210 in FIG. 2) representing a semantic search query from a user. In at least one embodiment, at step 604, a processor retrieves training artifacts (e.g., training artifacts 108) to be compared to the input query vector. In at least one embodiment, at step 606, a processor compares the input query vector to training artifacts representing the records stored in the database and generates a similarity score. For example, ML prediction processor 132 compares vectors of similar data types and computes an average value to generate a similarity score. A higher value similarity score may indicate a greater similarity, relatedness, or correspondence between a given record stored in the database and the input query. Accordingly, training artifacts with a high value similarity score to the input query vector artifact are determined to be matching artifacts, indicating a result to an input query.

FIG. 6B illustrates a sentencer model process 610 used by a machine learning system, according to at least one embodiment. In at least one embodiment, sentencer model process 610 uses Spacy models to break down the large input text into meaningful smaller snippets. The snippets may then be compared to input text, and an aggregated score may be determined. By performing this sentencer process, better search results as well as higher confidence scores may be obtained. In at least one embodiment, by dividing the text records using a sentencer model as disclosed herein, semantic search results can be improved because the full contexts of large text records can be properly identified and better matched to an input query.

In at least one embodiment, at step 612, a processor receives an input having large text (e.g., having many paragraphs or sentences). The input may be a training record (e.g., from a training process of FIG. 3) or an input query (e.g., from an inferencing process of FIG. 4). In at least one embodiment, at step 614, a processor intelligently divides the large text into smaller snippets (or portions) such that sentences belonging to the same paragraph are kept together, maintaining context for each portion of the large text. In at least one embodiment, at step 616, each snippet is compared to an input query to generate an aggregate confidence or similarity score. In at least one embodiment, by dividing the text records using a sentencer model as disclosed herein, semantic search results can be improved because the full contexts of large text records can be properly identified and better matched to an input query.

FIG. 6C illustrates a data compression process 620 used by a machine learning system, according to at least one embodiment. In at least one embodiment, a processor performing data compression process 610 reduces the size of the artifacts by using dimensionality reduction and storing float values as float6 instead of float32. Dimensionality reduction may help in reducing the number of vector dimensions generated from a GUSE algorithm needed for inference without any significant change in prediction results but with a smaller model size. In at least one embodiment, by performing data compression as disclosed herein, more records can be stored into the model for similarity comparison.

In at least one embodiment, at step 622, a processor receives a vectorized input (e.g., from vectorizing module 124 or 134). The vectorized input may be a training artifact (e.g., from a training process of FIG. 3) or an input query vector artifact (e.g., from an inference process of FIG. 4). In at least one embodiment, at step 624, a processor reduces vector dimensions and format. For example, an input vector may be reduced in dimension and may be truncated or rounded down to compress a float32 value into a float6 value. In at least one embodiment, the dimension reduction is based on a type of algorithm used to generate the vectorized input. For example, a vector generated using a GUSE algorithm may have 512 dimensions, which may be reduced to 150 dimensions. In at least one embodiment, at step 626, the reduced vectors are output as artifacts (e.g., training artifacts or input query vector artifact) to the other portions of the system. In at least one embodiment, by compressing the vector data in this manner, an ML model storage size can be reduced by approximately 50%.

In an embodiment, some or all of processes 600, 610, and 620 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of processes 600, 610, and 620 may be performed by any suitable system, such as the computing device 700 of FIG. 7.

Figure 7:
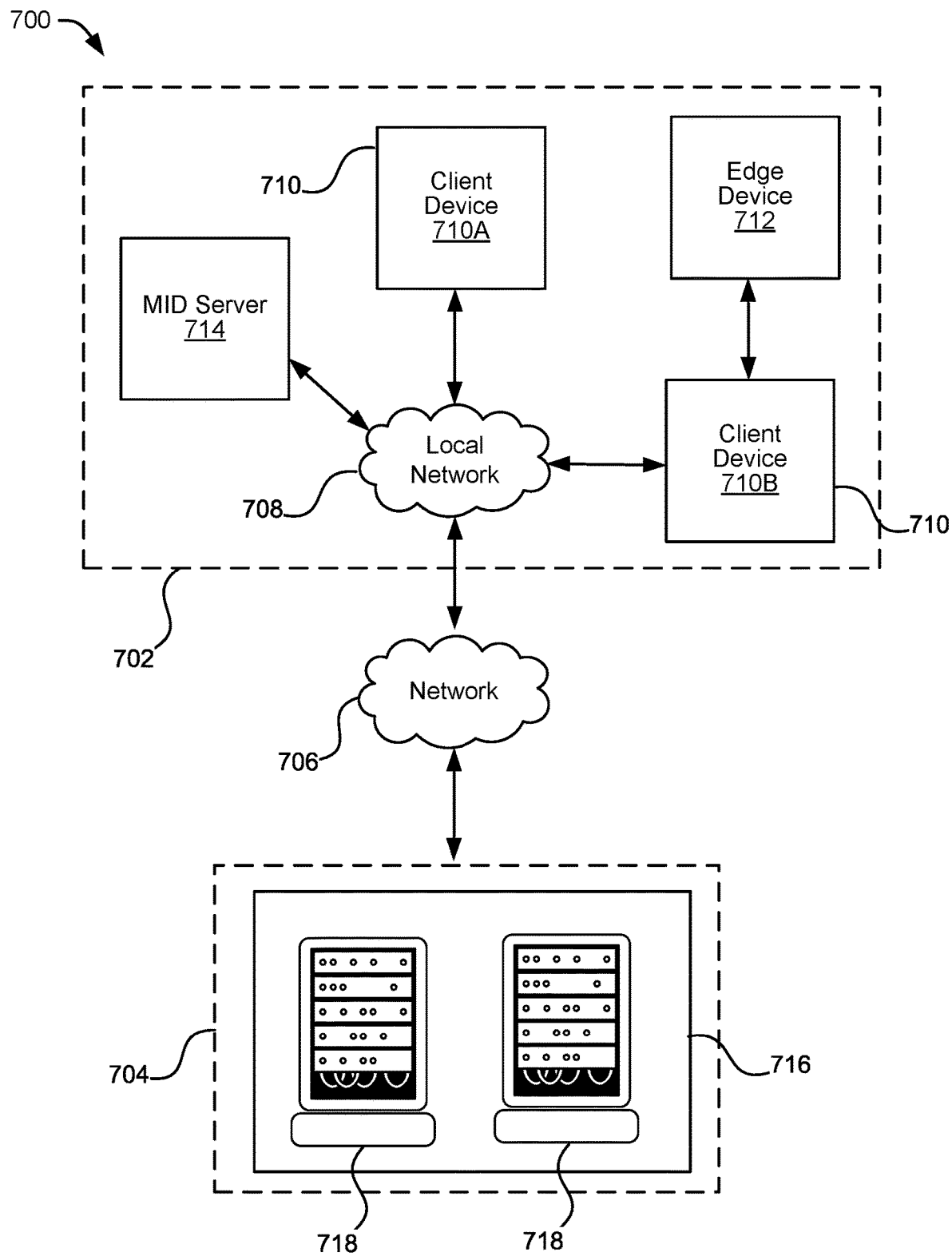
FIG. 7 illustrates a system in which various embodiments can be implemented.

FIG. 7 illustrates a system 700 in which various embodiments can be implemented. The system 700 may include a client network 702 and a provider platform 704 that are operably connected via a network 706 (e.g., the Internet). In an embodiment, the client network 702 may be a private local network 708, such as a local area network (LAN) that includes a variety of network devices that include, but are not limited to, switches, servers, and routers. In an embodiment, the client network 702 can comprise an enterprise network that can include one or more LANs, virtual networks, data centers, and/or other remote networks. In an embodiment, the client network 702 can be operably connected to one or more client devices 710 such as example client device 710A, 710B so that the client devices 710 are able to communicate with each other and/or with the provider platform 704. In an embodiment, the client devices 710 can be computing systems and/or other types of computing devices generally referred to as Internet of Things (IoT) devices that can access cloud computing services, for example, via a web browser application or via an edge device 712 that may act as a gateway between one or more client devices 710 and the platform 704 (e.g., second client device 710B). In an embodiment, the client network 702 can include a management, instrumentation, and discovery (MID) server 714 that facilitates communication of data between the network hosting the platform 704, other external applications, data sources, and services, and the client network 702. In an embodiment, the client network 702 may also include a connecting network device (e.g., a gateway or router) or a combination of devices that implement a customer firewall or intrusion protection system.

In an embodiment, the client network 702 can be operably coupled to the network 706, which may include one or more suitable computing networks, such a large area network (LAN), wide area networks (WAN), the Internet, and/or other remote networks, that are operable to transfer data between the client devices 710 and the provider platform 704. In an embodiment, one or more computing networks within network 706 can comprise wired and/or wireless programmable devices that operate in the electrical and/or optical domain. For example, network 706 may include wireless networks, such as cellular networks (e.g., Global System for Mobile Communications (GSM) based cellular network), WIN networks, and/or other suitable radio-based networks. The network 706 may also employ any suitable network communication protocols, such as Transmission Control Protocol (TCP), Internet Protocol (IP), and the like. In an embodiment, network 706 may include a variety of network devices, such as servers, routers, network switches, and/or other suitable network hardware devices configured to transport data over the network 706.

In an embodiment, the provider platform 704 may be a remote network (e.g., a cloud network) that is able to communicate with the client devices 710 via the client network 702 and network 706. In an embodiment, the provider platform 704 can comprise a configuration management database (CMDB) platform. In an embodiment, the provider platform 704 provides additional computing resources to the client devices 710 and/or the client network 702. For example, by utilizing the provider platform 704, in some examples, users of the client devices 710 can build and execute applications for various enterprise, IT, and/or other organization-related functions. In one embodiment, the provider platform 704 can be implemented on the one or more data centers 716, where each data center 716 can correspond to a different geographic location in some examples. In an embodiment, one or more the data centers 716 includes a plurality of servers 718 (also referred to in some examples as application nodes, virtual servers, application servers, virtual server instances, application instances, application server instances, or the like), where each server 718 can be implemented on a physical computing system, such as a single electronic computing device (e.g., a single physical hardware server) or across multiple-computing devices (e.g., multiple physical hardware servers). Examples of servers 718 can include a virtual server, a web server (e.g., a unitary Apache installation), an application server (e.g., a unitary Java Virtual Computer), and/or a database server.

To utilize computing resources within the provider platform 704, in an embodiment, network operators may choose to configure the data centers 716 using a variety of computing infrastructures. In an embodiment, one or more of the data centers 716 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 718 and/or other combinations of physical and/or virtual servers 718, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 704, and customer-driven upgrade schedules.

In some embodiments, the provider platform 704 includes a computer-generated data management server that receives, via network 706 and/or an internal network within or across different data centers, computer-generated data for storage and analysis. For example, log entries can be sent from client devices/servers 710, MID server 714 (e.g., agent server acting as the intermediary in client network 702 to facilitate access to client network 702 by the network hosting the platform 704), and/or servers in data centers 716 to a log management server in data centers 716.

Although FIG. 7 illustrates a specific embodiment of a cloud computing system 700, the disclosure is not limited to the specific embodiments illustrated in FIG. 7. For instance, although FIG. 7 illustrates that the platform 704 is implemented using data centers, other embodiments of the platform 704 are not limited to data centers and can utilize other types of remote network infrastructures. Some embodiments may combine one or more different virtual servers into a single virtual server. The use and discussion of FIG. 7 are only examples to facilitate ease of description and explanation and are not intended to limit the disclosure to the specific examples illustrated therein. In an embodiment, the respective architectures and frameworks discussed with respect to FIG. 7 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

One aspect of the disclosure includes a method for performing a semantic search. The method may include obtaining a plurality of records. The method may further include generating a set of training artifacts by, for each record of the plurality of records, vectorizing, using a first machine learning model of a first platform, the respective record into a respective artifact and adding the respective artifact to the set of training artifacts. The method may further include receiving a query at a second machine learning model of a second platform. The method may further include loading the set of training artifacts to the second machine learning model of the second platform. The method may further include vectorizing, using the second machine learning model, the query. The method may further include, for each artifact of the set of training artifacts, comparing, using the second machine learning model, the vectorized query to the respective artifact to produce a similarity score, identifying a matching artifact, wherein the matching artifact comprises the highest similarity score, and returning, in response to the query, the matching artifact.

Implementations of the disclosure may include one or more of the following features. The method may indicate that vectorizing the query includes dividing, using a sentencer, the query into a plurality of portions and vectorizing, using the second machine learning model, each portion of the plurality of portions. The method may include, for each artifact of the set of artifacts, reducing a precision format of the artifact through truncation. The method may further include for each artifact of the set of artifacts, reducing a dimensionality of the artifact. The method may additionally indicate the first machine learning model of a first platform is Python-based and the second machine learning model of a second platform is a Java-based. The method may additionally indicate that vectorizing the respective record into a respective artifact further comprises performing a term frequency-inverse document frequency (TF-IDF) algorithm on the respective record. The method may additionally indicate that vectorizing the respective record into a respective artifact further comprises performing a Google universal sentence encoder (GUSE) algorithm on the respective record.

Another aspect of the disclosure includes a system comprising one or more processors and a memory including computer-executable instructions. The one or more processors, when executing the computer-executable instructions, may cause the system to obtain a plurality of records. The one or more processors may further cause the system to generate a set of training artifacts by, for each record of the plurality of records, vectorizing, using a first machine learning model of a first platform, the respective record into a respective artifact and adding the respective artifact to the set of training artifacts. The one or more processors may further cause the system to receive a query at a second machine learning model of a second platform. The one or more processors may further cause the system to load the set of training artifacts to the second machine learning model of the second platform. The one or more processors may further cause the system to vectorize, using the second machine learning model, the query. The one or more processors may further cause the system to, for each artifact of the set of training artifacts, compare, using the second machine learning model, the vectorized query to the respective artifact to produce a similarity score, identify a matching artifact, wherein the matching artifact comprises the highest similarity score, and return, in response to the query, the matching artifact.

Implementations of the disclosure may additionally include one or more of the following features. The one or more processors may further cause the system to indicate that vectorizing the query includes dividing, using a sentencer, the query into a plurality of portions and vectorizing, using the second machine learning model, each portion of the plurality of portions. The one or more processors may further cause the system to, for each artifact of the set of artifacts, reduce a precision format of the artifact through truncation. The one or more processors may further cause the system to, for each artifact of the set of artifacts, reduce a dimensionality of the artifact. The one or more processors may further cause the system to indicate the first machine learning model of a first platform is Python-based. The one or more processors may further cause the system to indicate that vectorizing the respective record into a respective artifact further comprises performing a term frequency-inverse document frequency (TF-IDF) algorithm on the respective record. The system may be a data center and the plurality of records may be stored on a database in a server in the data center.

Another aspect of the disclosure includes a non-transitory computer-readable storage medium having stored thereon executable instructions that are executable by one or more processors of a computer system. The computer-readable storage medium may include instructions that cause the computer system to obtain a plurality of records. The computer-readable storage medium may include instructions that cause the computer system to generate a set of training artifacts by, for each record of the plurality of records, vectorizing, using a first machine learning model of a first platform, the respective record into a respective artifact and adding the respective artifact to the set of training artifacts. The computer-readable storage medium may include instructions that cause the computer system to receive a query at a second machine learning model of a second platform. The computer-readable storage medium may include instructions that cause the computer system to load the set of training artifacts to the second machine learning model of the second platform. The computer-readable storage medium may include instructions that cause the computer system to vectorize, using the second machine learning model, the query. The computer-readable storage medium may include instructions that cause the computer system to, for each artifact of the set of training artifacts, compare, using the second machine learning model, the vectorized query to the respective artifact to produce a similarity score, identify a matching artifact, wherein the matching artifact comprises the highest similarity score, and return, in response to the query, the matching artifact.

Implementations of the disclosure may additionally include one or more of the following features. The computer-readable storage medium may further include instructions that cause the computer system to indicate that vectorizing the query includes dividing, using a sentencer, the query into a plurality of portions and vectorizing, using the second machine learning model, each portion of the plurality of portions. The computer-readable storage medium may further include instructions that cause the computer system to, for each artifact of the set of artifacts, reduce a dimensionality of the artifact. The computer-readable storage medium may further include instructions that cause the computer system to indicate the second machine learning model of a second platform is Java-based. The computer-readable storage medium may further include instructions that cause the computer system to indicate that vectorizing the respective record into a respective artifact further comprises performing a GUSE algorithm on the respective record. The computer-readable storage medium may further include instructions that cause the computer system to identify additional matching artifacts, wherein the additional matching artifacts comprise second highest similarity scores and return, in response to the query, the additional matching artifacts.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—For example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method for performing a semantic search, comprising:
    obtaining a plurality of records;
    generating a set of training artifacts by:
        for each record of the plurality of records:
            vectorizing, using a first machine learning model of a first platform, the respective record into a respective artifact; and
            adding the respective artifact to the set of training artifacts;
    receiving a query at a second machine learning model of a second platform;
    loading the set of training artifacts to the second machine learning model of the second platform;
    vectorizing, using the second machine learning model, the query; and
    for each artifact of the set of training artifacts:
        comparing, using the second machine learning model, the vectorized query to the respective artifact to produce a similarity score;
        identifying a matching artifact, wherein the matching artifact comprises the highest similarity score; and
        returning, in response to the query, the matching artifact.

2. The method of claim 1, wherein vectorizing the query further comprises:
    dividing, using a sentencer, the query into a plurality of portions; and
    vectorizing, using the second machine learning model, each portion of the plurality of portions.

3. The method of claim 1, further comprising:
    for each artifact of the set of artifacts, reducing a dimensionality of the artifact.

4. The method of claim 1, further comprising:
    for each artifact of the set of artifacts, reducing a precision format of the artifact through truncation.

5. The method of claim 1, wherein the first machine learning model of a first platform is Python-based and the second machine learning model of a second platform is Java-based.

6. The method of claim 1, wherein vectorizing the respective record into a respective artifact further comprises performing a term frequency-inverse document frequency (TF-IDF) algorithm on the respective record.

7. The method of claim 1, wherein vectorizing the respective record into a respective artifact further comprises performing a Google universal sentence encoder (GUSE) algorithm on the respective record.

8. A system, comprising:
one or more processors; and
memory including computer-executable instructions that, if executed by the one or more processors, cause the system to:
obtain a plurality of records;
generate a set of training artifacts by:
for each record of the plurality of records:
vectorizing, using a first machine learning model of a first platform, the respective record into a respective artifact; and
adding the respective artifact to the set of training artifacts;
receive a query at a second machine learning model of a second platform;
load the set of training artifacts to the second machine learning model of the second platform;
vectorize, using the second machine learning model, the query; and
for each artifact of the set of training artifacts:
compare, using the second machine learning model, the vectorized query to the respective artifact to produce a similarity score;
identify a matching artifact, wherein the matching artifact comprises the highest similarity score; and
return, in response to the query, the matching artifact.

9. The system of claim 8, wherein vectorizing the query further comprises:
dividing, using a sentencer, the query into a plurality of portions; and
vectorizing, using the second machine learning model, each portion of the plurality of portions.

10. The system of claim 8, further comprising:
for each artifact of the set of artifacts, reducing a dimensionality of the artifact.

11. The system of claim 8, wherein the first machine learning model of a first platform is Python-based.

12. The system of claim 8, wherein vectorizing the query further comprises performing a term frequency-inverse document frequency (TF-IDF) algorithm on the respective record.

13. The system of claim 8, further comprising:
reducing a precision format of the vectorized query through truncation.

14. The system of claim 8, wherein the system is a data center and the plurality of records are stored on a database in a server in the data center.

15. A non-transitory computer-readable storage medium having stored thereon executable instructions which, when executed by one or more processors of a computer system, cause the computer system to:
obtain a plurality of records;
generate a set of training artifacts by:
for each record of the plurality of records:
vectorizing, using a first machine learning model of a first platform, the respective record into a respective artifact; and
adding the respective artifact to the set of training artifacts;
receive a query at a second machine learning model of a second platform;
load the set of training artifacts to the second machine learning model of the second platform;
vectorize, using the second machine learning model, the query; and
for each artifact of the set of training artifacts:
compare, using the second machine learning model, the vectorized query to the respective artifact to produce a similarity score;
identify a matching artifact, wherein the matching artifact comprises the highest similarity score; and
return, in response to the query, the matching artifact.

16. The non-transitory computer-readable storage medium of claim 15, wherein vectorizing the query further comprises:
dividing, using a sentencer, the query into a plurality of portions; and
vectorizing, using the second machine learning model, each portion of the plurality of portions.

17. The non-transitory computer-readable storage medium of claim 15, wherein the one or more processors further cause the computer system to:
reduce a dimensionality of the vectorized query.

18. The non-transitory computer-readable storage medium of claim 15, vectorizing the query further comprises performing a GUSE algorithm on the respective record.

19. The non-transitory computer-readable storage medium of claim 15, wherein the second machine learning model of a second platform is Java-based.

20. The non-transitory computer-readable storage medium of claim 15, wherein the one or more processors further cause the computer system to:
identify additional matching artifacts, wherein the additional matching artifacts comprise second highest similarity scores; and
return, in response to the query, the additional matching artifacts.

* * * * *